United States Patent
Yamazaki et al.

(10) Patent No.: US 6,955,758 B2
(45) Date of Patent: Oct. 18, 2005

(54) OZONE TREATING APPARATUS

(75) Inventors: Kazutoshi Yamazaki, Otsu (JP); Kozo Shirato, Kawaguchi (JP); Kazuyasu Kawashima, Yokohama (JP); Akira Sato, Soka (JP); Akihiko Nagai, Mitaka (JP)

(73) Assignee: Sekisui Chemical Co., Ltd., Osaka (JP)

(*) Notice: Subject to any disclaimer, the term of this patent is extended or adjusted under 35 U.S.C. 154(b) by 0 days.

(21) Appl. No.: 10/169,946

(22) PCT Filed: Jan. 12, 2001

(86) PCT No.: PCT/JP01/00121
§ 371 (c)(1),
(2), (4) Date: Oct. 30, 2002

(87) PCT Pub. No.: WO01/51187
PCT Pub. Date: Jul. 19, 2001

(65) Prior Publication Data
US 2003/0116491 A1 Jun. 26, 2003

(30) Foreign Application Priority Data

| | | |
|---|---|---|
| Jan. 12, 2000 | (JP) | 2000-003704 |
| May 9, 2000 | (JP) | 2000-136052 |
| May 23, 2000 | (JP) | 2000-151565 |
| Aug. 9, 2000 | (JP) | 2000-241312 |

(51) Int. Cl.$^7$ .......................... B01F 1/00; B01D 71/36; C02F 1/78

(52) U.S. Cl. .................. 210/150; 210/188; 210/198.1; 210/205; 210/259; 261/77; 261/DIG. 19; 96/155

(58) Field of Search ................ 210/760, 143, 210/150, 188, 198.1, 202, 205, 259, 321.87, 416.1; 261/76, 77, DIG. 19; 96/155

(56) References Cited

U.S. PATENT DOCUMENTS

| | | | | |
|---|---|---|---|---|
| 5,061,302 A | * | 10/1991 | Zuback | 96/194 |
| 5,073,268 A | * | 12/1991 | Saito et al. | 210/638 |
| 5,271,830 A | * | 12/1993 | Faivre et al. | 210/151 |
| 5,366,619 A | * | 11/1994 | Matsui et al. | 210/139 |
| 5,865,995 A | * | 2/1999 | Nelson | 210/205 |
| 5,876,604 A | * | 3/1999 | Nemser et al. | 210/634 |
| 5,902,747 A | * | 5/1999 | Nemser et al. | 435/325 |
| 6,086,057 A | * | 7/2000 | Mitsumori et al. | 261/122.1 |

FOREIGN PATENT DOCUMENTS

| | | | |
|---|---|---|---|
| EP | 0 723 806 A2 | | 7/1966 |
| JP | 7-213880 A | | 8/1995 |
| JP | 9-94449 | * | 4/1997 |
| JP | 10-192846 A | | 7/1998 |
| JP | 10-202074 | * | 8/1998 |
| JP | 10-277370 | * | 10/1998 |
| JP | 11-77023 | * | 3/1999 |
| JP | 11-071600 | | 3/1999 |
| JP | 11-158494 A | | 6/1999 |
| JP | 11-227087 | | 8/1999 |
| JP | 11-333284 | * | 12/1999 |
| JP | 11-347373 A | | 12/1999 |

* cited by examiner

Primary Examiner—Fred G. Prince
(74) Attorney, Agent, or Firm—Sughrue Mion, PLLC

(57) ABSTRACT

The present invention provides an ozonization apparatus which is not only capable of dissolving ozone in material water with high efficiency and speedily but also enables the easy and proper control of the dissolved ozone concentration of ozone water.

The present invention relates to an ozonization apparatus comprising
an ozone gas-permeable membrane disposed to isolate material water and ozone gas from each other and allow said ozone gas to be dissolved in said material water by permeation, said ozone gas-permeable membrane being a nonporous hollow tube which is selectively gas-permeable and liquid-impermeable.

17 Claims, 3 Drawing Sheets

OZONE TREATING APPARATUS

TECHNICAL FIELD

The present invention relates to an ozonization apparatus for use in an ozone water production system in which ozone gas is dissolved in material water to produce ozone water or a water purification system utilizing ozone in which ozone is dissolved in a factory effluent or other waste water for an oxidizing treatment, among other applications.

BACKGROUND ART

The ozone water obtained by dissolving ozone gas in water exhibits excellent disinfection, deodorization and bleaching actions on account of the strong oxidizing power of ozone. In addition, because ozone gas undergoes autodecomposition to oxygen (gas), which is harmless, with the passage of time and causes no residue problem, it is attracting attention as an ecofriendly disinfectant, cleaner and bleach, for instance.

In order to insure a positive disinfectant, cleaning and bleaching effect, the dissolved ozone gas concentration of ozone water must be high enough but since ozone gas is not only sparingly soluble in water by nature but has the disadvantage that increasing the ozone gas concentration frivolously would reduce the efficiency with which ozone is utilized and, hence, lead to a waste of the material, it is of great significance to control the ozone gas concentration suitably in the production and use of ozone water.

The conventional ozone water production and/or purification system which is generally employed is a bubbling system in which ozone gas is bubbled into water or an ejector system involving the use of an ejector.

The bubbling system has the disadvantage that it requires a gas-liquid separation column for removal of bubbles. Moreover, although the finer the mist of ozone gas bubbled is, the higher is the rate of dissolution attained, the gas-liquid separation is a time-consuming process. Thus, in the bubbling system, the efficiency of dissolution of ozone gas in water is very low and the dissolved ozone gas concentration can hardly be controlled appropriately.

Meanwhile, in the manufacture of semiconductor or liquid crystal devices, a stripping operation for removing the used photoresist is carried out frequently in the photolithographic process. In this photoresist stripping operation, the use of chemicals in large quantities and the high temperature required for photoresist removal impose a considerable burden on clean-room air conditioning and amidst the mounting interest in the protection of environment, a resist stripping technology using ozone water as a substitute for the conventional chemicals is attracting attention.

In connection with the above resist stripping technology involving the use of ozone water, the relationship of ozone water concentration to the resist striping rate was investigated and it has by now been elucidated that increasing the ozone water concentration contributes much to an increased stripping rate (Collection of Papers Read Before the $8^{th}$ Annual Research Meeting of Japanese Ozone Association, pp. 14–16, Mar. 3, 1998).

Furthermore, although the cleaning of semiconductor wafers and other substrates has been conventionally carried out by the RCA process using sulfuric acid, ammonia or hydrochloric acid, the use of ozone water for this cleaning has been studied of late from ecological and other considerations (Mitsubishi Electric Technology Vol. 173, Nov. 4, 1999).

Japanese Kokai Publication Hei-7-213880 discloses an ozone gas-permeable membrane in the form of a porous hollow tube. However, in the case of a porous ozone gas-permeable membrane, it may not be possible to preclude contamination of ozone water with metal particles finding their way into the ozone gas during gas production insofar as an ozone generator of the silent discharge type is employed.

SUMMARY OF THE INVENTION

In view of the above state of the art, the present invention has for its object to provide an ozonization apparatus which is not only capable of dissolving ozone in material water with high efficiency and speedily but also enables the easy and proper control of the dissolved ozone concentration of ozone water.

The present invention relates to an ozonization apparatus comprising an ozone gas-permeable membrane disposed to isolate material water and ozone gas from each other and allow said ozone gas to be dissolved in said material water by permeation, said ozone gas-permeable membrane being a nonporous hollow tube which is selectively gas-permeable and liquid-impermeable, and said ozone gas-permeable membrane is a membrane made of a fluororesin or a silicone resin. When the ozone gas-permeable membrane is a membrane made of a fluororesin, it preferably has a tube wall thickness of not more than 0.2 mm, on the other hand, when the ozone gas-permeable membrane is a membrane made of a silicone resin, it preferably has a tube wall thickness of less than 1 mm.

The ozonization apparatus of the present invention preferably comprises a degassing module for removing dissolved gas from the material water.

The present invention, therefore, is directed to an ozonization apparatus comprising a degassing module for removing dissolved gases from the material water, an ozone dissolution module for dissolving ozone gas in the degassed material water to prepare a primary ozone water, and an ozone concentration adjusting module for removing a necessary amount of dissolved ozone gas from said primary ozone water to control the dissolved ozone gas concentration and thereby provide a secondary ozone water. Said ozone concentration adjusting module comprises a negative pressure tank and a degassing tube selectively gas-permeable and liquid-impermeable as installed within said negative pressure tank, said degassing tube being adapted to admit the primary ozone water while a reduced pressure is established in the free space within said negative pressure tank or said negative pressure tank being adapted to admit the primary ozone water while a reduced pressure is established within the lumen of said degassing tube. The degassing tube mentioned above is made of a fluororesin or a silicone resin.

The ozonization apparatus of the present invention preferably comprises a first ozone sensor for detecting the dissolved ozone gas concentration of said primary ozone water and a second ozone sensor for detecting the dissolved ozone gas concentration of said secondary ozone water.

A photoresist stripping apparatus and a substrate cleaning apparatus, both comprising the ozonization apparatus of the invention, are also preferred embodiments of the invention.

BRIEF DESCRIPTION OF THE DRAWINGS

In FIGS. 1 to 5, the reference numeral 1 represents a degassing module, 2 an ozone dissolution module, 3 an ozone concentration adjusting module, 4 a first ozone sensor, 5 a second ozone sensor, 6 an ozone generator, 7 a reservoir tank, 8 an ozone water reservoir tank, 10 a material water source (water storage tank), 11 a vacuum tank, 12 a degassing tube, 21 a housing, 22 an ozone gas-permeable membrane, 31 a negative pressure tank, 32 a degassing tube, 41 a photoresist stripping tank, 42 a photoresist-carrying substrate, 43 an etched substrate stripped of the photoresist, 53 an ozone compressor, 55 a needle valve, 57 a substrate cleaning chamber, 91 a first flowmeter, 93 a second flowmeter, and 94 an ozone gas sensor. Further, W, W' each stands for material water, OG for ozone gas, OW for primary ozone water, and OW' for secondary ozone water.

DISCLOSURE OF INVENTION

The present invention is now described in detail.

In the following, one embodiment of the ozonization apparatus of the invention is described in detail, referring to FIG. 1. It should, however, be understood that the present invention is by no means limited to the specific embodiment illustrated in FIG. 1 but may be implemented in many other forms.

Figure 1:
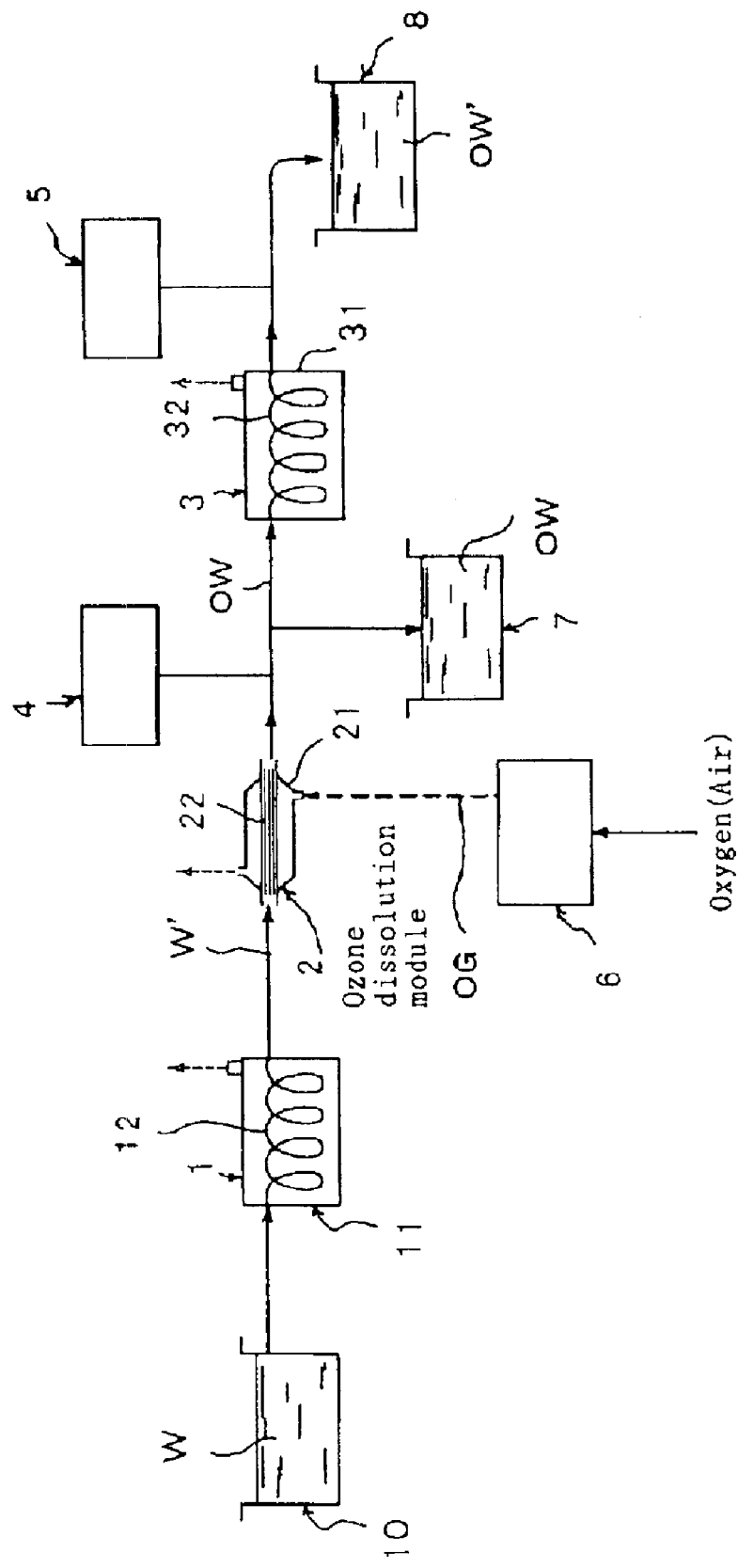
FIG. 1 is an elementary view showing one embodiment of the ozonization apparatus according to the present invention.

The ozonization apparatus illustrated in FIG. 1 comprises an ozone dissolution module 2 for dissolving ozone gas (OG) in material water (W') to prepare ozone water (OW) as a nuclear component and, as ancillary equipment, further comprises a degassing module 1 which removes dissolved gases from material water (W) such as tap water or ultrapure water for facilitating dissolution of ozone gas and an ozone concentration adjusting module 3 which removes an appropriate amount of dissolved ozone gas from a primary ozone water (OW) produced by said ozone dissolution module 2 to control the dissolved ozone gas concentration and thereby produce a secondary ozone water (OW') which is the end product. In addition, the apparatus is further equipped with a first ozone sensor 4 for detecting the concentration of dissolved ozone gas in the primary ozone water (OW) produced by said ozone dissolution module 2 and a second ozone sensor 5 for detecting the concentration of dissolved ozone gas in the secondary ozone water (OW') produced by said ozone concentration adjusting module 3.

The degassing module 1 is provided for the purpose of removing dissolved gases from material water in which ozone gas is to be dissolved to thereby preclude dissolution of unwanted gases other than ozone in ozone water and facilitate dissolution of ozone gas.

The material water (W) mentioned above is not particularly restricted but may for example be tap water, deionized water or ultrapure water.

The degassing module mentioned above is not particularly restricted but may for example be a device similar to the known vacuum degassing equipment which comprises a vacuum tank 11, a vacuum pump (not shown) for evacuating said vacuum tank 11, and a degassing tube 12 providing for passage of material water (W) as installed in said vacuum tank 11.

The degassing tube 12 for use in the degassing module 1 is not particularly restricted provided that it is selectively gas-permeable and liquid-impermeable, thus including a hollow tubular structure made of, for example, a fluororesin or a silicone resin and having a necessary size in inside diameter and length. The degassing tube 12 is installed internally of the vacuum tank 11, with one open end serving as a liquid inlet being communicably connected to a source of material water (W) (a water reservoir tank 10), while the other open end serving as a liquid outlet is communicably connected to the ozone dissolution module 2, so that as the material water (W) is admitted from said liquid inlet and caused to flow through the degassing tube 12 while a negative pressure control is maintained in the vacuum tank 11 by a vacuum pump or the like, the material water (W) is deprived of dissolved gases in the course of flow to said liquid outlet.

Figure 2:
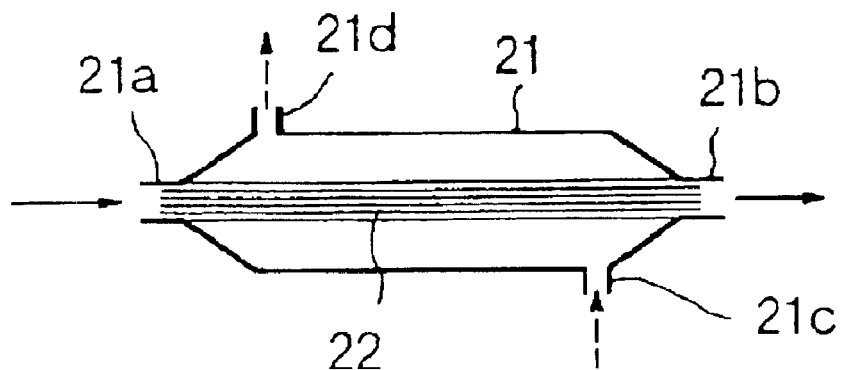
FIG. 2 is a schematic view showing an example of the ozone dissolution module to be used in the present invention.

FIG. 2 shows the ozone dissolution module 2 on exaggerated scale.

The ozone dissolution module 2 is designed to dissolve ozone gas in material water to produce ozone water. More particularly, the module 2 is designed to dissolve ozone gas (OG) in material water (W'), viz. the material water which has been deprived of dissolved gases in advance, to produce a primary ozone water (OW). The ozone dissolution module 2 comprises a housing 21 and an ozone gas-permeable membrane 22 disposed in said housing 21 to isolate the material water (W') deprived of dissolved gases in advance from the ozone gas (OG) supplied from an ozone generator 6.

The ozone gas-permeable membrane 22 is made of a membrane material which is selectively gas-permeable and liquid-impermeable, particularly a membrane material which resists corrosion and aging due to ozone gas and is selectively permeable to ozone gas, such as a fluororesin or a silicone resin.

The fluororesin mentioned above includes tetrafluoroethylene resin polymers such as polytetrafluoroethylene resin (PTFE), perfluoroalkoxy resin (PFA), fluorimated ethylene-propylene copolymer resin (FEP), and fluorine-containing rubber, among others. As to the silicone resin, methylsilicone rubber can be mentioned, for instance.

The ozone gas-permeable membrane 22 can be produced by molding such a membrane material as above into a nonporous hollow tubular structure having a necessary size in inside diameter and length, and a plurality of unit lengths of such ozone gas-permeable membrane 22 are thermally fused or bonded end-to-end into a bundle and installed in the housing 21.

When a porous membrane is used as said ozone gas-permeable membrane 22, it is difficult to completely prevent contamination of ozone water with metallic impurities scattered into the ozone gas generated by an ozone generator of the silent discharge type but this contamination can be completely precluded by using a nonporous membrane. Moreover, when a hollow tubular membrane is used as the ozone gas-permeable membrane 22, a large surface area can be provided as compared with the use of a membrane in a sheet form and assuming that the capacity of the ozone dissolution module is constant, a more efficient treatment can be carried out.

When the ozone gas-permeable membrane 22 is made of a fluororesin, the wall thickness of the tube is preferably not more than 0.2 mm, while, in the case of a membrane made of a silicone resin, the wall thickness of the tube is preferably less than 1 mm. If the thickness exceeds the above limit in either case, a practically acceptable ozone concentration may hardly be obtained.

The geometry of the housing 21 is not particularly restricted but may be shaped like a tank or a hollow tubular structure having a necessary length, for instance. The material of which the housing 21 is made is not particularly restricted provided that it is highly resistant to ozone and gas-tight. As an example, stainless steel can be mentioned.

The ozone gas-permeable membrane 22 is installed in the housing 21 in such a manner that although the material water (W') supplied from the degassing module 1 is isolated from the ozone gas (OG) supplied from the ozone generator 6, the ozone gas may come into contact with the material water (W') across the ozone gas-permeable membrane 22 by permeation. In this connection, the ozone gas (OG) supply line is preferably pressurized so that the ozone gas (OG) may be forced to permeate through the ozone gas-permeable membrane 22. By pressurizing the ozone gas in this manner, the ozone gas can be dissolved in the material water in a larger quantity and more efficiently.

In order that ozone gas may be dissolved in material water (W') in the ozone dissolution module 2, a hollow tubular ozone gas-permeable membrane 22 is installed in the housing 21 and the material water (W') is caused to fill up or flow within the lumen of said ozone gas-permeable membrane 22 while ozone gas (OG) is caused to fill up or flow down the free space within the housing 21 or, conversely, the material water (W') is caused to fill up or flow down the free space within the housing 21 while ozone gas (OG) is caused to fill up or flow down the lumen of the hollow tubular ozone gas-permeable membrane 22.

In the embodiment illustrated in FIGS. 1 and 2, an ozone gas-permeable membrane 22 is installed in a generally cylindrical housing 21 in such a manner that one open end of said membrane 22 is disposed at a liquid inlet 21a of housing 21 while the other open end is disposed at a liquid outlet 21b of housing 21 to constitute an ozone dissolution module, said liquid inlet 21a of housing 21 being communicably connected to the degassing module 1 to serve as an inlet for material water (W') and said liquid outlet 21b of housing 21 being connected to the ozone concentration adjusting module 3 or the reservoir tank 7 to serve as an outlet for primary ozone water (OW).

The ozone generator 6 is communicating with the housing 21 through the gas inlet 21c formed on the opposite side of the liquid inlet 21a of housing 21 and the internal free space of the housing 21 is maintained in a pressurized condition by the ozone gas (OG) supplied from the ozone generator 6. With the free space within the housing 21 being thus pressurized, the material water (W') which has been degassed in the degassing module 1 is admitted from the liquid inlet 21a into the lumen of the hollow tubular ozone gas-permeable membrane 22 in a countercurrent manner with respect to the flow of ozone gas (OG), whereby the pressurized ozone gas (OG) in the housing 21 is forced to permeate through the hollow tubular ozone gas-permeable membrane 22 and dissolves in the material water (W'), and the resulting primary ozone water (OW) emerges from the liquid outlet 21b of the housing 21, while the excess ozone gas (OG) is exhausted from a gas outlet 21d of the housing 21.

Contrary to the arrangement illustrated in FIGS. 1 and 2, it may be so arranged that ozone gas (OG) is admitted into the lumen of said hollow tubular ozone gas-permeable membrane 22 via said liquid inlet 21a of housing 21 while the material water (W') is admitted from said gas inlet 21c of housing 21 so that the ozone gas (OG) permeating through the ozone gas-permeable membrane 22 is dissolved in the material water (W').

The ozone generator 6 is not particularly restricted but may for example be a silent discharge type in which air or oxygen gas is passed through a silent discharge to generate ozone gas or an ultraviolet irradiation device.

The dissolved ozone gas concentration of the primary water (OW) produced by said ozone dissolution module 2 is monitored by the first ozone sensor 4 connected to the ozone dissolution module 2. Since generally the dissolved ozone gas concentration of the primary water (OW) produced in the ozone dissolution module 2 is fairly high, it may be a prudent choice to provisionally store the primary ozone water in a reservoir tank 7 (which may serve as a photoresist stripping water tank 41 as well) and adjust its dissolved ozone gas concentration appropriately in the ozone concentration adjusting module 3.

The ozone concentration adjusting module 3 removes an appropriate amount of dissolved ozone gas from the primary ozone water (OW) prepared in the ozone dissolution module 2 to thereby adjust the dissolved ozone gas concentration of the end product secondary ozone water (OW').

The ozone concentration adjusting module 3 is not particularly restricted but may for example be a unit comprising a negative pressure tank 31, a vacuum pump (not shown) for decompressing the free space within the negative pressure tank 31, and a degassing tube 32 installed in said negative pressure tank 31.

By admitting the primary ozone water (OW) from the ozone dissolution module 2 into the lumen of said degassing tube 32 while the free space within the negative pressure tank 31 of the ozone concentration adjusting module 3 or admitting the primary ozone water (OW) from the ozone dissolution module 2 into the negative pressure tank 31 while the lumen of the degassing tube 32 is maintained under reduced pressure, an appropriate amount of dissolved ozone gas is removed from the primary ozone water (OW) produced in the ozone dissolution module 2 to adjust the dissolved ozone gas concentration and thereby provide a secondary ozone water (OW') of the desired ozone gas concentration.

The degassing tube 32 for use in the ozone concentration adjusting module 3 is a tube made of a membrane material which is selectively gas-permeable and liquid-impermeable, preferably a membrane material highly resistant to corrosion and aging due to ozone gas, such as a fluororesin or a silicone resin.

As said fluororesin and silicone resin, the same resins as those mentioned for said ozone gas-permeable membrane can be employed.

The degassing tube for use in the invention can be obtained by molding such a membrane material as above into a hollow tubular structure having the necessary size in inside diameter and length.

In the embodiment illustrated in FIG. 1, the degassing tube 32 is installed within the negative pressure tank 31 with one of its open ends serving as a liquid inlet being connected to the ozone dissolution module 2 for admitting primary ozone water (OW) and the other open end serving as a liquid outlet being connected to an ozone water reservoir tank 8, and the primary ozone water (OW) prepared in the ozone dissolution module 2 is admitted from said liquid inlet into the degassing tube 32 while the free space within the negative pressure tank 31 is maintained under reduced pressure by a vacuum pump or the like, whereby an appropriate amount of dissolved gas is removed from the primary ozone water (OW) to adjust the dissolved ozone gas concentration and thereby give a secondary ozone water (OW') of the desired ozone gas concentration.

The dissolved ozone gas concentration of the secondary ozone water (OW') prepared in the ozone concentration adjusting module 3 is monitored by a second ozone sensor 5 connected to said module 3. However, a single sensor may be caused to double as said first ozone sensor 4 for monitoring the dissolved ozone gas concentration of the primary ozone water (OW) from the ozone dissolution module 2 and the second ozone sensor 5 mentioned just above by providing a switch valve (not shown) or the like device adapted to choose from the alternatives, namely monitoring of the dissolved ozone gas concentration of primary ozone concentration of primary ozone water (OW) or that of the dissolved ozone gas concentration of secondary ozone water (OW').

The ozone sensors 4 and 5 mentioned above are not particularly restricted but each may for example be a continuous-measuring dissolved-ozone monitor utilizing ultraviolet absorption spectrometry.

With the ozonization apparatus of the present invention, ozone water of the desired ozone concentration can be produced with safety, ease and high efficiency and, therefore, the apparatus can be used in the ozone treatment of plant effluents or for disinfection, cleaning and bleaching in various industries.

Furthermore, with the ozonization apparatus of the invention, an ozone water of high concentration can be produced quickly and accurately so that for the photolithographic process in the manufacture of semiconductor or liquid crystal devices, the ozonization apparatus of the invention can be utilized to implement a compact photoresist stripping apparatus which is capable of removing the used photoresist with high efficiency and does not require a bubbling system or a gas-liquid separation column. The photoresist stripping apparatus comprising the ozonization apparatus of the invention is also an embodiment of the present invention.

Figure 4:
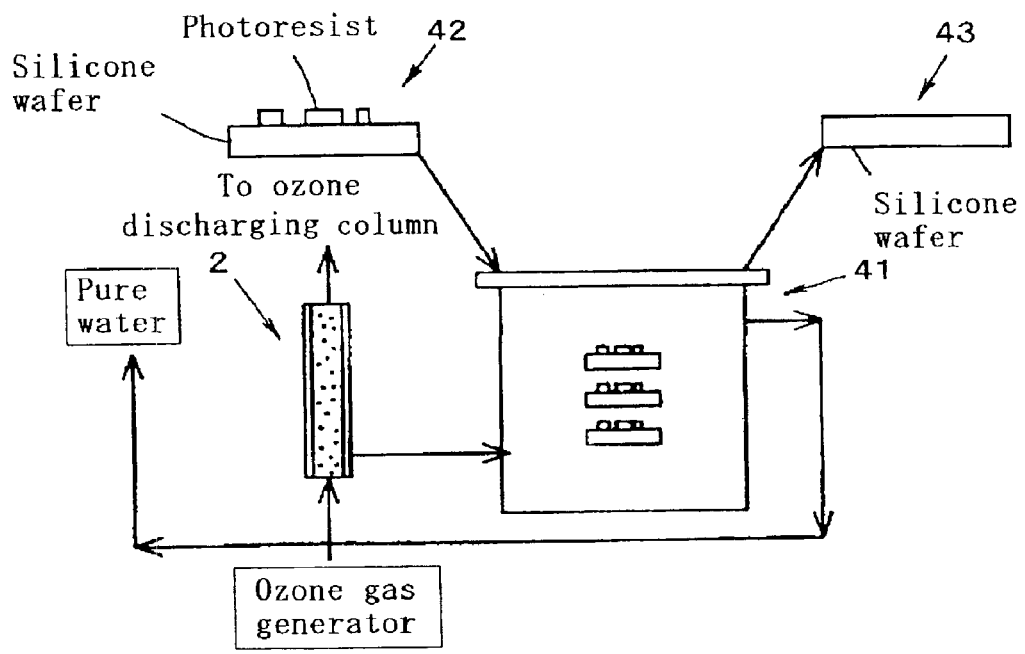
FIG. 4 is a sketch showing an embodiment of the photoresist stripping apparatus according to the present invention.

A specific embodiment of said photoresist stripping apparatus is illustrated in FIG. 4. In the embodiment shown in FIG. 4, the ozone water produced in the ozone dissolution module 2 is transferred to a photoresist stripping tank 41 and stored therein. As a photoresist-carrying substrate 42 is dipped in this high-concentration ozone water pooled in the photoresist stripping tank 41, the photoresist layer only is selectively removed and the etched substrate 43 can be taken out. The ozone water in the photoresist stripping tank 41 is returned to the ozone dissolution module 2 so that it may regain a predetermined concentration and be recirculated.

The substrate constituting said photoresist-carrying substrate is not particularly restricted but, in the manufacture of semiconductor devices, for instance, means a silicon wafer or, in the manufacture of liquid crystal display devices, means a glass panel. Referring, further, to the photoresist stripping apparatus, means for removing the photoresist layer with ozone water is not restricted to a circulation type apparatus comprising a batch unit such as the photoresist stripping bath shown in FIG. 4 but may be a contact type apparatus utilizing a spray system or a curtain flow system, for instance.

Furthermore, since the ozonization apparatus of the invention provides for the production of a clean ozone water of high concentration without risks for contamination with metal particles originating from an ozone generator, the apparatus can be utilized to implement a substrate cleaning apparatus. The substrate cleaning apparatus comprising the ozonization apparatus of the invention also constitutes an embodiment of the invention.

As used in this description, the term "cleaning" means the removal of surface dirt and oily contaminants from substrates or the removal of the used photoresist, among others, from substrates in the manufacture of circuit boards and the like.

Figure 5:
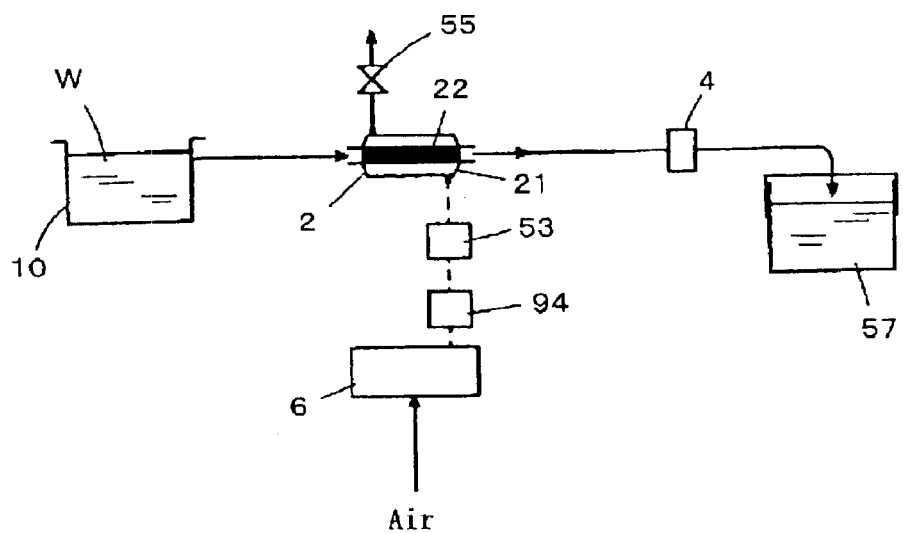
FIG. 5 is an elementary view showing an embodiment of the substrate cleaning apparatus according to the present invention.

FIG. 5 shows a specific embodiment of said substrate cleaning apparatus.

The embodiment illustrated in FIG. 5 comprises said ozone dissolution module 2 as a nuclear component and further comprises an ozone gas sensor 94 for detecting the ozone gas (OG) generated by the ozone generator 6, a compressor 53 for pressurizing the ozone gas, a needle valve 55 which adjusts the degree of evacuation, an ozone sensor 4 for detecting the concentration of the ozone water (OW) prepared in said ozone dissolution module 2, and a substrate cleaning chamber 57 for cleaning substrates or the like with the product ozone water.

The mode of cleaning within said substrate cleaning chamber 57 is not particularly restricted but may for example be a dip mode or a spray mode.

The compressor 53 is not particularly restricted provided that it is capable of pressurizing the ozone gas (OG) produced by the ozone generator 6 to the level higher than atmospheric pressure but preferably is a pressure pump made of ozone-resisting material.

BEST MODE FOR CARRYING OUT THE INVENTION

The following examples illustrate the present invention in further detail without defining the scope of the invention.

REFERENCE EXAMPLE 1

Ozonization Apparatus

Figure 3:
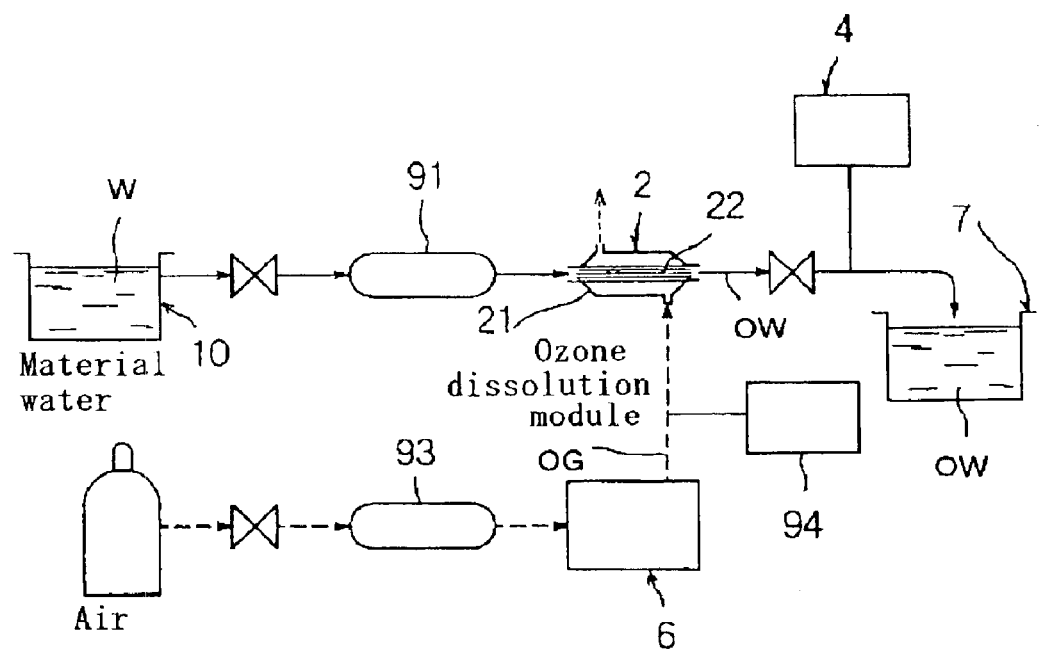
FIG. 3 is an elementary view showing an example of the ozone dissolution system to be used in the present invention.

As an embodiment of the invention, the ozonization apparatus illustrated in FIG. 3 was constructed.

As the material water (W), tap water adjusted to the same temperature as room temperature was used and, by means of a pump (manufactured by EYELA, RP-1000), not shown, was fed into the lumen of a hollow tubular ozone gas-permeable membrane 22 of the ozone dissolution module 2 via a first flowmeter 91. On the other hand, as the raw material ozone gas (OG), air was supplied at a pressure of 0.05 MPa via a second flowmeter 93. This air was ozonized in an ozone generator 6 (manufactured by Sumitomo Precision Industry, SG-C1-PSA2) and, after monitoring of the concentration of ozone gas by an ozone gas sensor (manufactured by Riko Kagaku, OZR 911) 94, the gas was admitted into the ozone dissolution module 2 (the free space within the housing 21) and caused to permeate through the hollow tubular ozone gas-permeable membrane 22 and dissolve in material water (W). The dissolved ozone gas concentration of the product ozone water (OW) was detected by the ozone sensor (manufactured by Riko Kagaku, OZR911) 4.

EXAMPLE 1

The ozone dissolution module 2 shown in FIG. 2 and the ozonization apparatus shown in FIG. 3 were used. As the nonporous hollow tubular ozone gas-permeable membrane 22, a bundle of 500 polytetrafluoroethylene resin (PTFE) tubes each measuring 0.5 mm in inside diameter, 0.15 mm thick, and 1 m long, which meets the AWG (American Wire Gage specification) 24, was used. The bundle of tubes was set in the housing 21, made of poly(vinyl chloride), 30 mm inside diameter and 1,000 mm long, and while the tap water adjusted to the same temperature as room temperature (20° C.) in advance was admitted into the lumen of said nonporous hollow tubular ozone gas-permeable membrane 22 from the liquid inlet 21*a* of the ozone dissolution module 2, an ozone gas of 40 mg/NL concentration was supplied from the gas inlet 21*c* of the ozone dissolution module 2 at a pressure of 0.05 MPa in a countercurrent fashion with respect to the flow of said tap water. In the meantime, the flow rate of the tap water was varied stepwise and the dissolved ozone gas concentration of the ozone water produced was monitored with the ozone concentration sensor (manufactured by Riko Kagaku Kenkyusho, OZR911). The results are presented in Table 1.

TABLE 1

| Flow rate (mL/min) | Concentration of ozone water (mg/L) |
| --- | --- |
| 50 | 3.8 |
| 100 | 2.4 |
| 220 | 1.2 |
| 500 | 0.8 |

It is apparent from Table 1 that ozone concentrations not less than 1 ppm, which are generally used, could be obtained in Example 1.

EXAMPLE 2

Except that a bundle of 60 PTFE tubes each measuring 0.5 mm in inside diameter, 0.05 mm thick, and 1 m long was used, the ozone concentration was measured in the same manner as in Example 1. The results are presented in Table 2.

TABLE 2

| Flow rate (mL/min) | Concentration of ozone water (mg/L) |
| --- | --- |
| 56 | 3.4 |
| 112 | 1.9 |
| 220 | 1.0 |
| 360 | 0.5 |

It is apparent from the above results that by reducing the membrane thickness from 0.15 mm to 0.05 mm, an ozone concentration of the same order can be obtained with about one-tenth of the number of tubes, indicating that the efficiency of dissolution of ozone gas is dependent on tube thickness.

REFERENCE EXAMPLE 2

Except that a bundle of 500 PTFE tubes each measuring 0.5 mm in inside diameter, 0.22 mm thick, and 1 m long was used, the ozone concentration was measured in the same manner as in Example 1. The results are presented in Table 3.

TABLE 3

| Flow rate (mL/min) | Concentration of ozone water (mg/L) |
| --- | --- |
| 50 | 0.6 |
| 110 | 0.3 |
| 220 | 0.2 |

It is apparent from the above results that when the tube thickness exceeds 0.2 mm, a practically useful ozone concentration can hardly be obtained.

EXAMPLE 3

Except that a bundle of 100 silicone tubes each measuring 0.5 mm in inside diameter, 0.25 mm thick, and 1 m long was used as the nonporous hollow tubular ozone gas-permeable membrane, the ozone concentration was measured in the same manner as in Example 1. The results are presented in Table 4.

TABLE 4

| Flow rate (mL/min) | Concentration of ozone water (mg/L) |
| --- | --- |
| 150 | 7.1 |
| 250 | 5.1 |
| 330 | 4.6 |
| 550 | 3.1 |

It is apparent from the above results that an ozone water of high concentration could be obtained.

EXAMPLE 4

Except that a bundle of 30 silicone tubes each measuring 1 mm in inside diameter, 0.5 mm thick, and 1 m long was used, the ozone concentration was measured in the same manner as in Example 3. The results are presented in Table 5.

TABLE 5

| Flow rate (mL/min) | Concentration of ozone water (mg/L) |
| --- | --- |
| 150 | 1.6 |
| 250 | 1.1 |
| 330 | 1.0 |
| 550 | 0.7 |

It is apparent from the above results that an ozone water of high concentration could be obtained.

REFERENCE EXAMPLE 3

Except that a bundle of 15 silicone tubes each measuring 1 mm in inside diameter, 1 mm thick, and 1 m long was used, the ozone concentration was measured in the same manner as in Example 3. The results are presented in Table 6.

TABLE 6

| Flow rate (mL/min) | Concentration of ozone water (mg/L) |
| --- | --- |
| 150 | 0.5 |
| 250 | 0.4 |
| 330 | 0.3 |
| 550 | 0.2 |

It is apparent from the above results that when the membrane thickness exceeds 1 mm, a practically useful ozone concentration can hardly be obtained and the dissolution efficiency per unit capacity is lowered to a practically unfavorable level.

EXAMPLE 5

Photoresist Stripping Operation

Using a spin coater (1H-DXNII, manufactured by Mikasa), a positive-acting resist for TFT use (OFPR-PR13, product of Tokyo Ohyo Kagaku Kogyo) was uniformly applied onto a square glass panel measuring 1000×1000 mm and dried by heating at 90° C. for 30 minutes to construct a photoresist layer on the glass substrate. The thickness of the above photoresist layer was 1.1 μm.

The above sample was dipped in ozone water in a photoresist stripping tank filled with the ozone water prepared in each of Examples 1 and 2 and Reference Example 2 for 30 minutes to investigate the degree of removal of the photoresist layer. As a result, whereas the photoresist layer had been completely removed with the ozone water obtained in Example 1 or 2, only a 0.3 μm portion had been removed with the ozone water prepared in Reference Example 2.

EXAMPLE 6

Ozone water was prepared using the ozone dissolution module shown in FIG. 2 and the substrate cleaning apparatus utilizing the module as shown in FIG. 5. A bundle of 90 silicone tubes each measuring 0.5 mm in inside diameter, 0.25 mm thick, and 1 m long was set as the nonporous hollow tubular ozone gas-permeable membrane and using a peristaltic pump (manufactured by EYELA, RP-1000), deionized water adjusted to the same temperature as room temperature in advance was supplied into the lumen of the tube from the inlet (21a) of the ozone dissolution module at a delivery rate of 260 mL/min.

On the other hand, the ozone gas from the ozone generator (manufactured by Sumitomo Precision Industry, SG-01-PSA2) was monitored for its gas pressure by an ozone gas concentration sensor (manufactured by Ebara Jitsugyo, EG-500) and supplied at a flow rate of 1.3 L/min. This ozone gas was pressurized with a compressor (manufactured by IWAKI, BA-230TN), adjusted to the proper pressure with a needle valve, and fed to a side inlet (21c) of the ozone dissolution module, whereby the ozone gas was caused to permeate across said nonporous ozone gas-permeable membrane and dissolve in the water within the tube lumen.

The concentrations of the ozone water obtained by changing the ozone gas pressure (gauge pressure) stepwise as above are shown in Table 7.

Evaluation of Dirtiness of Semiconductor Wafers

The ozone water having a varying ozone concentration was sprayed against 6-inch silicon wafers within the wafer chamber and the contamination level at the semiconductor wafer cleaning stage was evaluated by the qualitative and quantitative analysis of metal foulants remaining on the wafers by inductively coupled plasma mass spectrometry (ICP-MS). The results are presented in Table 7.

TABLE 7

| Ozone gas pressure (MPa) | Concentration of ozone water (mg/L) | Semiconductor wafer contamination evaluation (metallic contamination level) |
| --- | --- | --- |
| 0.01 | 2.7 | Not more than $10^{11}$ atoms/cm$^2$ |
| 0.067 | 4.3 | Not more than $10^{11}$ atoms/cm$^2$ |
| 0.15 | 6.6 | Not more than $10^{11}$ atoms/cm$^2$ |

It is apparent from the above results that the concentration of ozone water was as low as 2.7 mg/L when the pressure (0.01 MPa) from the ozone generator was directly used but when the ozone gas pressure was boosted by the pump, the concentration of the product ozone water rose in proportion to the ozone gas pressure as shown in Table 7. Moreover, the evaluation of dirtiness of semiconductor wafers revealed that the metal contaminant levels at the various ozone water concentrations were not more than $10^{10}$ atoms/cm$^2$, thus being substantially equal to the contamination level of the unused silicon wafer (blank).

COMPARATIVE EXAMPLE 1

The ozone gas produced by the ozone generator was not passed through the ozone dissolution module but was directly dissolved in material water and the resulting ozone water was used in the same metal contamination evaluation as in Example 6. As a result, the contamination level was obviously higher, viz. $10^{11}$~$10^{13}$ atoms/cm$^2$.

Thus, unlike the ozone water prepared by contacting the ozone gas from the ozone generator directly with water, the ozone water obtained by causing the ozone gas to permeate across a nonporous tubular ozone gas-permeable membrane and dissolve in material water in the present invention is completely free from contaminants originating from the ozone gas generator and it has been confirmed that this ozone water is quite suitable for the semiconductor wafer cleaning with ozone water.

Industrial Applicability

The present invention, constituted as above, provides an ozonization apparatus of simple mechanism and construction, which is not only resistant to corrosion and aging due to ozone gas but capable of dissolving ozone gas selectively in material water to produce ozone water of a desired concentration with safety, ease, and high efficiency.

What is claimed is:

1. An ozonization apparatus comprising
   an ozone gas-permeable membrane disposed to isolate material water and ozone gas from each other and allow said ozone gas to be dissolved in said material water by permeation, said ozone gas-permeable membrane being a nonporous hollow tube which is selectively gas-permeable and liquid-impermeable,
   wherein the ozone gas-permeable membrane is a membrane consisting of a tetrafluoroethylene resin polymer or a fluorine-containing rubber, and has a tube wall thickness of not more than 0.2 mm.

2. The ozonization apparatus according to claim 1, wherein the ozone gas-permeable membrane is a membrane consisting of a polytetrafluoroethylene resin, a perfluoroalkoxy resin or fluorimated ethylene-propylene copolymer resin.

3. A photoresist stripping apparatus comprising the ozonization apparatus according to claim 2.

4. A substrate cleaning apparatus comprising the ozonization apparatus according to claim 2.

5. The ozonization apparatus according to claim 1 comprising
   a degassing module for removing dissolved gas from the material water.

6. A photoresist stripping apparatus comprising the ozonization apparatus according to claim 1.

7. A substrate cleaning apparatus comprising the ozonization apparatus according to claim 1.

8. An ozonization apparatus comprising
   an ozone gas-permeable membrane disposed to isolate material water and ozone gas from each other and allow said ozone gas to be dissolved in said material water by permeation, said ozone gas-permeable membrane being a nonporous hollow tube which is selectively gas-permeable and liquid-impermeable,
   wherein the ozone gas-permeable membrane is a membrane consisting of a silicone resin and has a tube wall thickness of less than 1 mm.

9. A photoresist stripping apparatus comprising the ozonization apparatus according to claim 8.

10. A substrate cleaning apparatus comprising the ozonization apparatus according to claim 8.

11. An ozonization apparatus comprising a degassing module for removing dissolved gases from the material water, an ozone dissolution module for dissolving ozone gas in the degassed material water to prepare a primary ozone water, and an ozone concentration adjusting module for removing a necessary amount of dissolved ozone gas from said primary ozone water to control the dissolved ozone gas concentration and thereby provide a secondary ozone water.

12. The ozonization apparatus according to claim 11 comprising a first ozone sensor for detecting the dissolved ozone gas concentration of said primary ozone water and a second ozone sensor for detecting the dissolved ozone gas concentration of said secondary ozone water.

13. The ozonization apparatus according to claim 11, wherein said ozone concentration adjusting module comprises a negative pressure tank and a degassing tube selectively gas-permeable and liquid-impermeable as installed within said negative pressure tank, said degassing tube being adapted to admit the primary ozone water while a reduced pressure is established in the free space within said negative pressure tank.

14. The ozonization apparatus according to claim 13, wherein the degassing tube is made of a fluororesin or a silicone resin.

15. The ozonization apparatus according to claim 11, wherein the ozone concentration adjusting module comprises a negative pressure tank and a degassing tube selectively gas-permeable and liquid-impermeable as installed within said negative pressure tank, said negative pressure tank being adapted to admit the primary ozone water while a reduced pressure is established within the lumen of said degassing tube.

16. The ozonization apparatus according to claim 15, wherein the degassing tube is made of a fluororesin or a silicone resin.

17. A photoresist stripping apparatus comprising the ozonization apparatus according to claim 11.

* * * * *